(No Model.)

J. T. HANRAHAN.
WATER HEATER.

No. 512,191. Patented Jan. 2, 1894.

Witnesses
J. F. Harris.
A. M. Turner.

Inventor
James T. Hanrahan
By his Attorney
W. M. Brown.

THE NATIONAL LITHOGRAPHING COMPANY,
WASHINGTON, D. C.

UNITED STATES PATENT OFFICE.

JAMES T. HANRAHAN, OF ALBANY, NEW YORK.

WATER-HEATER.

SPECIFICATION forming part of Letters Patent No. 512,191, dated January 2, 1894.

Application filed July 14, 1893. Serial No. 480,545. (No model.)

*To all whom it may concern:*

Be it known that I, JAMES T. HANRAHAN, a citizen of the United States, residing at Albany, Albany county, New York, have invented certain new and useful Improvements in Water-Heaters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a new and improved water heater, especially for baths.

Figure 1:
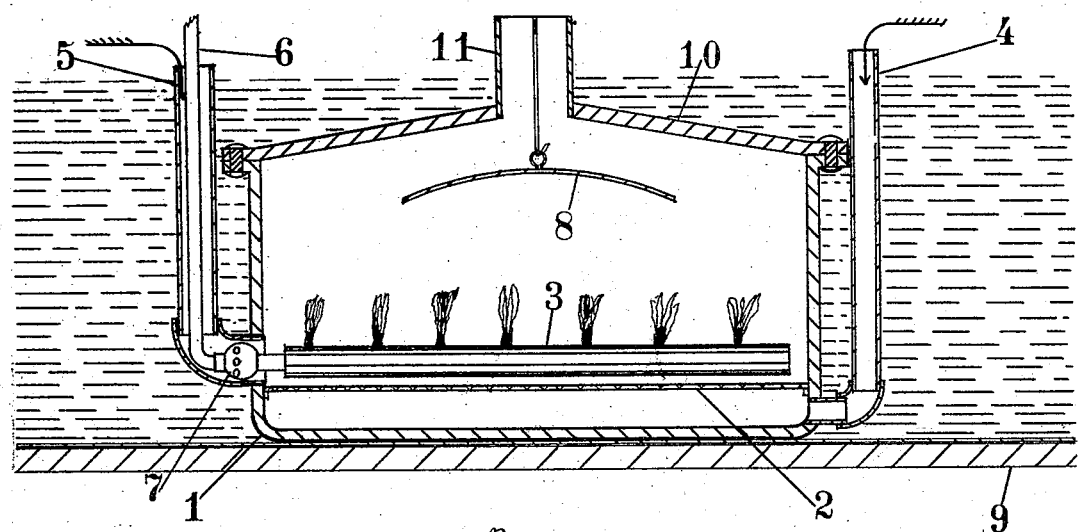
Figure 2:
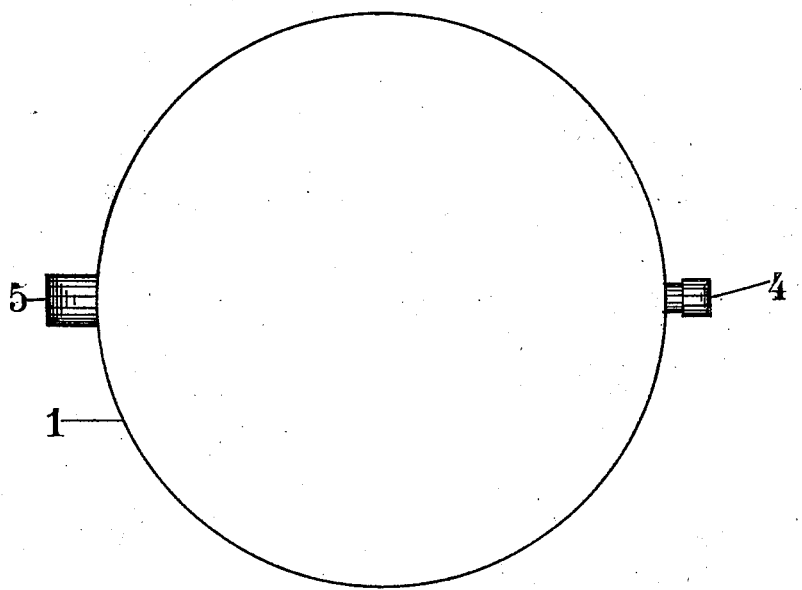

In the drawings, Figure 1, shows a vertical sectional view of my apparatus set in a bath tub in operative construction and Fig. 2 a plan view of the bottom thereof.

The body or casing of my apparatus is preferably made of copper and is pressed into shape preferably by means of dies to avoid all seaming and soldering as far as possible. This casing 1 has a cover 10 with an escape pipe 11, the cover 10 being pitched or conical as shown preferably, and it is preferably riveted to the flange on the upper edge of casing 1. The conical cover 10 is so formed in order that any water of condensation that may form on its under surface may run down and off at the edges instead of falling directly down upon the burner 3. On the right will be seen open tube 4 which serves as a passage for a down draft of air with which to supply the burner 3 with atmosphere and on the left will be seen another tube 5 which incloses tube 6, said tube 6 being a gas pipe connected to a gas supply with which the burner is fed with gas. As the gas passes down pipe 6 it enters the mixer 7 and draws into the mixer a quantity of air and mixes it with the gas so as to produce blue or atmospheric flames at the burner. The mixer 7 is the ordinary form of mixer used with gas stoves and therefore does not need extended description. Under the burner is a perforated plate, preferably a gauze wire sheet, its object being to compel the air coming down pipe 4 to pass through the gauze 2 and thus be spread and evenly supplied to the burner.

At 8 will be seen a deflector which compels the heat as it rises and strikes against it to be deflected and pass over its lower surface and thus detains it longer in the heater than if it were allowed to pass directly up the flue 11.

9 shows the bottom of a vessel holding water as a bath-tub in which the heater is seen immersed.

The operation is as follows: The apparatus is water tight and being placed in a bath tub having water in it, it sinks to the bottom and rests on the bottom of tub. It may have its burner lighted before or after putting it in the water, and if after, the deflector 8 may be pushed aside and a lighted taper passed down through flue 11 and thus the burner be lighted, the pipe 6 being connected with a gas supply. As the gas passes down pipe 6 it enters the mixer 7 and draws into it a supply of air, which is supplied to the mixer by a down draft in pipe 5, and the mixed gas and air then passes to the burner 3 and is consumed. As the heat arises from the flames, it strikes the sides of the casing 1 and when first lighted, the condensation of water on its sides will be considerable and especially on the under surface of the cover but, the cover being convex or having sloping sides, the condensed water forming on it is discharged by running down the slanting sides and off on the sides of the casing 1 whereas, otherwise, it would fall upon the burner and interfere with the burning of the gas. A part of the heat rising from the burners will strike against deflector 8 and be deflected or caused to take a more circuitous course inside the heater than it would if allowed to pass directly up the flue 11 thus utilizing more of the heat than would otherwise be done. While the burners are operating the draft caused by the rising heat passing out of the flue 11, makes a down draft in pipe 4 which empties under the gauze partition 2 and the air finds its way up through the gauze and is evenly supplied to the burners. The heated sides of the casing 1 soon heat the water to any desired degree. When the water is sufficiently heated, the apparatus is lifted out, turned upside down and all water of condensation collected therein is allowed to run out of flue 11, its slanting sides being made purposely for this end.

Having fully described my invention, what I claim is—

1. A water heater consisting of a chamber arranged to be submerged in the liquid to be heated and having an escape outlet with its exit end above the surface of the liquid, and an induction pipe for air arranged to admit an air supply at a point below a perforated partition in said chamber and a burner located above said partition, and having a fuel pipe arranged to feed the burner with a combustible, said fuel pipe entering said chamber through a second air induction pipe and having a mixing apparatus for mixing the combustible with air located in the exit of said second induction air pipe that the burner may be caused to produce a heating flame substantially as described.

2. A water heater consisting of a chamber arranged to be submerged in the liquid to be heated and having an escape pipe for the escape of the products of combustion and a source of heat in said chamber located above a perforated false floor in said chamber and an air induction pipe discharging below said false floor that the air supply may be uniformly supplied to the source of heat, and having a feed pipe to supply fuel and an air mixer located outside of said chamber and below the surface of the liquid to be heated and arranged to mix air with the fuel before it enters the chamber, substantially as described.

3. A water heater consisting of a chamber arranged to be submerged in the liquid to be heated, and having an escape pipe for the escape of the products of combustion and a source of heat in said chamber, and having a perforated false bottom located below the source of heat and a supply pipe arranged to supply fuel to the source of heat, and an air mixer located below the surface of the water arranged to mix air with the fuel supply before it reaches the source of heat and having an induction pipe to supply air to the interior of the chamber at a point below the perforated false bottom for the purposes described.

4. A water heater consisting of a chamber arranged to be submerged in the liquid to be heated, its top or cover sloping toward its side walls, and having a gas burner therein and a perforated plate located below the burner and an air supply discharging below said perforated plate, and having a deflector located above the burner and a gas supply pipe arranged to feed the burner through a gas and air mixer that a non-illuminating flame may be produced at the burner and having an escape pipe for the escape of the products of combustion for the purposes described.

In testimony whereof I affix my signature in presence of two witnesses.

JAMES T. HANRAHAN.

Witnesses:
W. M. BROWN,
A. M. TURNER.